Dec. 4, 1956 J. J. RONGEN ET AL 2,773,135
NEUTRALIZING CIRCUIT-ARRANGEMENT FOR AMPLIFYING
HIGH-FREQUENCY OSCILLATIONS
Filed Sept. 10, 1952

INVENTORS
JACOBUS JOHANNES RONGEN
ABRAHAM GEERTRUDAS WILHELMUS UITJENS
BY Fred M Vogel
AGENT United States Patent Office 2,773,135

Patented Dec. 4, 1956

2,773,135

NEUTRALIZING CIRCUIT-ARRANGEMENT FOR AMPLIFYING HIGH-FREQUENCY OSCILLATIONS

Jacobus Johannes Rongen and Abraham Geertrudas Wilhelmus Uitjens, Eindhoven, Netherlands, assignors to Hartford National Bank and Trust Company, Hartford, Conn., as trustee Application September 10, 1952, Serial No. 308,874

Claims priority, application Netherlands September 19, 1951

1 Claim. (Cl. 179—171)

Figure 1:
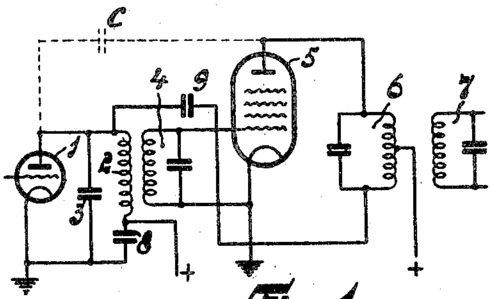

This invention relates to circuit-arrangements for amplifying high-frequency oscillations by means of an amplifier electrode system whose control-grid circuit and anode circuit both comprise a circuit tuned to the frequency to be amplified, the tuned circuit provided in the control-grid circuit forming part of the output circuit of a preceding electrode system. The last mentioned circuit may, for example, be the secondary circuit of a band-pass filter comprising two coupled circuits.

The present invention has for its object to remove certain parasitic capacitative couplings which occur in particular if a number of electrode systems are incorporated in a single envelope, for example in a triode-heptode. In this case a certain capacity constantly exists between the two anodes, even if the electrode systems are shielded from each other. If, for example, the triode portion is used as a mixing electrode system and the heptode portion is used as an intermediate frequency amplifier, and notably if band-pass filters are provided in the control grid circuit and in the anode circuit of the heptode portion, the said parasitic capacity, as has been found, brings about an undesired coupling at frequencies of 10 mc./s. and higher. When using band-pass filters in the control grid and anode circuits, this undesired coupling is a coupling between the primary circuit of the output band-pass filter and the primary circuit of the input band-pass filter. In this case the coupling coefficient is, in general, real and may be positive or negative dependent on the sense of winding the first band-pass filter. The reaction thus produced is evidenced by an increase or a decrease in amplification, the band-pass filter characteristic generally remaining symmetrical. If the reaction is such as to increase the amplification, unstability of the circuit-arrangement readily occurs, hence said coupling is always undesirable.

According to the invention a circuit-arrangement for amplifying high-frequency oscillations comprising a high-frequency amplifier electrode system, whose control-grid and anode circuit both comprise a circuit tuned to the frequency to be amplified, the circuit connected in the control-grid circuit forming part of the output circuit of a preceding electrode system is characterized by means for compensating the parasitic capacitative coupling between the anodes of the two electrode systems, which coupling produces a reaction between the circuit connected into said anode circuit and the preceding circuit(s). The said means may consist of an additional capacitative coupling between the primary circuit of a band-pass filter and the tuned circuit in the anode circuit, this coupling counteracting the said parasitic coupling.

The band-pass filters will in general comprise intercoupled parallel resonance circuits, points of which are earthed. In this event the additional capacitative coupling is obtainable by earthing a tapping point of the inductance of the circuit connected in the anode circuit with respect to high frequencies (since the tapping point is connected to the positive terminal of the supply battery). From the end, not connected to the anode, of the said inductance a voltage can then be taken, which counteracts the voltage introduced by the parasitic coupling.

It will, however, be more advantageous to connect a fixed capacitor between the inductance of the primary circuit and earth, the common point of the inductance and this capacitor being connected through a second fixed capacitor to the anode end of the tuned circuit included in the anode circuit of the second tube.

In order that the invention may be readily carried into effect, it will now be described in greater detail with reference to the accompanying drawing representing, by way of example, several embodiments thereof and in which Fig. 1 shows an embodiment of a circuit-arrangement in accordance with the invention, wherein the reference numeral 1 designates a triode acting, for example, as a mixer tube. The anode circuit of this triode comprises a circuit tuned to the intermediate frequency and comprising an inductance 2 and capacitors 3 and 8. The end, remote from the anode of the system 1, of the inductance of the circuit 2, 3 for the intermediate-frequency oscillations to be amplified, is connected to earth by the capacitor 8, but this capacitor can sometimes be dispensed with. When receiving frequency-modulated oscillations the intermediate frequency may be of the order of 10 mc./s.

The inductance 2 is inductively coupled to a second circuit 4 equally tuned to the intermediate frequency. Both circuits constitute a filter passing a band width of, say, 0.3 mc./s. The circuit 4 is connected between the cathode and the first control grid of a tube 5 represented as a heptode. The oscillations amplified by this tube appear across the circuit 6 which is tuned to the intermediate frequency and, together with the output circuit 7, constitutes a band-pass filter. For reasons mentioned later the supply voltage for the anode of tube 5 is supplied by way of a tapping on the inductance of circuit 6.

Notably if the electrode systems 1 and 5 are housed in a single tube, thus constituting a triode-heptode known per se, a certain capacity between the anodes of both systems is unavoidable. Even when using shielding means said capacity may still be of the order of magnitude of 0.2 pf. It has been found that said parasitic capacity may involve unstability or a decrease in amplification.

In order to mitigate this disadvantage the invention employs neutralisation consisting in that a fixed capacitor 9 is provided between the anode end of circuit 2, 3 and the end of circuit 6 remote from the anode. Through this capacitor a voltage is supplied to the circuit 2, 3, this voltage being capable, if the tapping point on the inductance of circuit 6 and the value of capacitor 9 are properly chosen, of exactly compensating for the voltage induced through the parasitic capacity designated C.

The capacitor 9 will generally be a trimmer. One disadvantage of the circuit-arrangement shown in Fig. 1 is that the value of capacitor 9 is particularly small, since it will be of the order of magnitude of the parasitic capacity C which is mostly about 0.2 pf.

Figure 2:
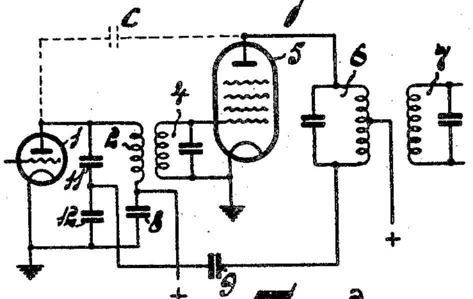

Fig. 2 shows a circuit-arrangement wherein this limitation is met. This circuit-arrangement comprises substantially the same elements as those shown in Fig. 1, the elements bearing the same reference numerals. It is different from the circuit-arrangement shown in Fig. 1, since the capacitor 3 is replaced by the series-connection of two capacitors 11, 12 and the compensation voltage is supplied to the common point of said capacitors. By a judicious choice of the values of capacitors 11, 12 the capacitor 9 may then have a much higher capacity so that for constructional reasons it is more practicable than in the circuit-arrangement shown in Fig. 1.

Figure 3:
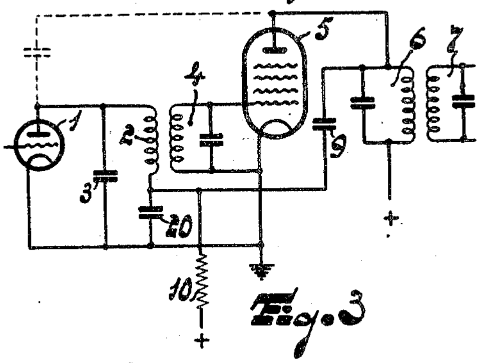

A still more advantageous circuit-arrangement in this respect is shown in Fig. 3. The chief difference between this circuit-arrangement and that shown in Figs. 1 and 2 is that the high value of capacitor 8 has been replaced by a capacitor 20 of much lower capacity, the latter capacitor now acting as a coupling capacitor. The supply voltage for the anode of the electrode system 5 may be supplied directly by way of that point of the inductance of circuit 6 which is not connected to the anode, hence a coil with tapping can be dispensed with. In this respect the circuit-arrangement is simpler than that shown in Figs. 1 and 2. Since the end of coil 2 not connected to the anode has a high-frequency voltage relatively to earth the anode voltage for the electrode system 1 is supplied by way of a supply resistor 10. The capacitor 9 compensating for the parasitic capacity C is provided between the anode of electrode system 5 and the common point of the elements 2 and 20.

In the circuit-arrangement shown in Fig. 3, the capacity of capacitor 20 is of the order of the magnitude of 1000 pf. The fixed or semi-fixed capacitor 9 may have a value of the order of 5 pf.

It has been found that in this circuit-arrangement the setting of the capacitors 9 and 20 is not very critical so that in the case of a fixed setting a sufficient degree of compensation of the parasitic capacity is produced between the anodes, even if the used triode-heptode is replaced by another one. The value of the capacity between the anodes may with impunity have a tolerance of approximately 20%.

In the circuit-arrangement shown in Fig. 3 the neutralising capacitor 9 is virtually connected in parallel with the circuit 6 and is instrumental in determining the frequency of this circuit. In setting it is therefore advisable to alter the value of capacitor 20, which is large with respect to that of capacitor 9, since in this case the natural frequency of circuit 6 varies to a lesser degree than if the capacitor 9 were set.

Figure 4:
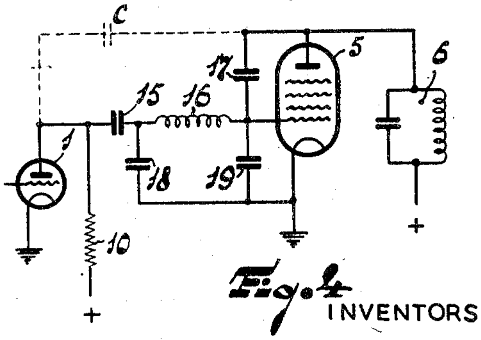

A circuit-arrangement, wherein compensation of the parasitic C between the anodes in a triode-heptode is effected in a slightly different manner is shown in Fig. 4. The anode-voltage for the triode-system is supplied through a supply resistor 10, the intermediate frequency output voltage of the mixer tube 1 being applied by way of a coupling capacitor 15 to the first-control grid of the high-frequency amplifier electrode system 5.

This occurs by way of an inductance 16 which together with capacitors 18 and 19 constitutes a filter tuned to the intermediate frequency. A capacity between the anode and the control-grid of system 5 is denoted 17.

In the circuit-arrangement shown in Fig. 4 compensation is obtained if the product of the capacity between the anodes of both electrode systems and the capacity between grid and cathode of the second electrode system substantially corresponds to the product of the capacity between anode and control-grid of the second electrode system and the capacity between anode and cathode of the first electrode system.

In respect of Fig. 4 it is pointed out that circuit-arrangements are known, wherein two cascade-connected tubes are connected through a similar filter. These known circuit-arrangements have for their object to give the required inductance an adequate and practical value.

In this event the proportions of the capacities will be different.

Part of the capacities 17, 18, 19 may be constituted by their natural electrodes and wiring capacities. As a rule, however, it will be necessary that the capacity 17 partly comprises an additional capacity provided between the anode and the first control grid of electrode system 5.

What we claim is:

An amplifier circuit comprising an electron tube containing two sections in a single envelope, each of said sections comprising a cathode, a control grid and an anode, said sections being positioned with respect to one another so that a parasitic capacitance occurs between said anodes, means connected to apply a signal to the control grid of a first one of said sections, a transformer having a primary winding connected at an end thereof to the anode of said first section and having a secondary winding connected to the control grid of the second one of said sections, an output circuit connected to the anode of said second section, a first capacitor connected at one terminal thereof to the remaining end of said primary winding and connected at the other terminal thereof jointly to said cathodes, and a second capacitor connected between the anode of said second tube and said remaining end of the primary winding and having a value of capacitance to neutralize said parasitic capacitance.

References Cited in the file of this patent

UNITED STATES PATENTS

| | | |
|---|---|---|
| 2,223,416 | Hansell et al. | Dec. 3, 1940 |
| 2,231,372 | Rothe et al. | Feb. 11, 1941 |
| 2,247,155 | Goodenough | June 24, 1941 |
| 2,360,794 | Rankin | Oct. 17, 1944 |
| 2,605,358 | Neher | July 29, 1952 |
| 2,692,919 | Cohen | Oct. 26, 1954 |

OTHER REFERENCES

Terman text, "Radio Engineering," 3d ed., page 367, published 1947 by McGraw-Hill Book Co.